United States Patent [19]
Gudmestad

[11] 3,857,306
[45] Dec. 31, 1974

[54] CABLE CUTTING AND STRIPPING MACHINE

[75] Inventor: Ragnar Gudmestad, West Allis, Wis.

[73] Assignee: Artos Engineering Company, New Berlin, Wis.

[22] Filed: June 15, 1973

[21] Appl. No.: 370,217

[52] U.S. Cl. .............................................. 81/9.51
[51] Int. Cl. .............................................. H02g 1/12
[58] Field of Search ................................. 81/9.51

[56] References Cited
UNITED STATES PATENTS

| | | | |
|---|---|---|---|
| 2,497,112 | 2/1950 | Andrem | 81/9.51 |
| 2,884,825 | 5/1959 | Eubanks | 81/9.51 |
| 3,309,948 | 3/1967 | Flanken | 81/9.51 |
| 3,368,428 | 2/1968 | Gudmestad | 81/9.51 |
| 3,612,111 | 10/1971 | Meyer | 81/9.51 |

Primary Examiner—Al Lawrence Smith
Assistant Examiner—Roscoe V. Parker, Jr.
Attorney, Agent, or Firm—James E. Nilles

[57] ABSTRACT

An electrical cable stock feeding device successively plays out measured lengths of cable from a supply reel. The played out stock is held in a lengthwise fixed position by a pair of clamping jaws; the measured cable length is cut from the fixed stock by a pair of blade assemblies; and the cut cable length is engaged by a pair of gripping jaws. The blade assemblies not only cut the stock but also the insulation at the adjacent ends of the remaining stock and of the cut cable length. The cut insulation is stripped from the free end of the remaining stock by movement of the blade assemblies away from the clamping jaws, and the cut insulation is stripped from the trailing end of the cut cable length by movement of the gripping jaws away from the blade assemblies.

18 Claims, 20 Drawing Figures

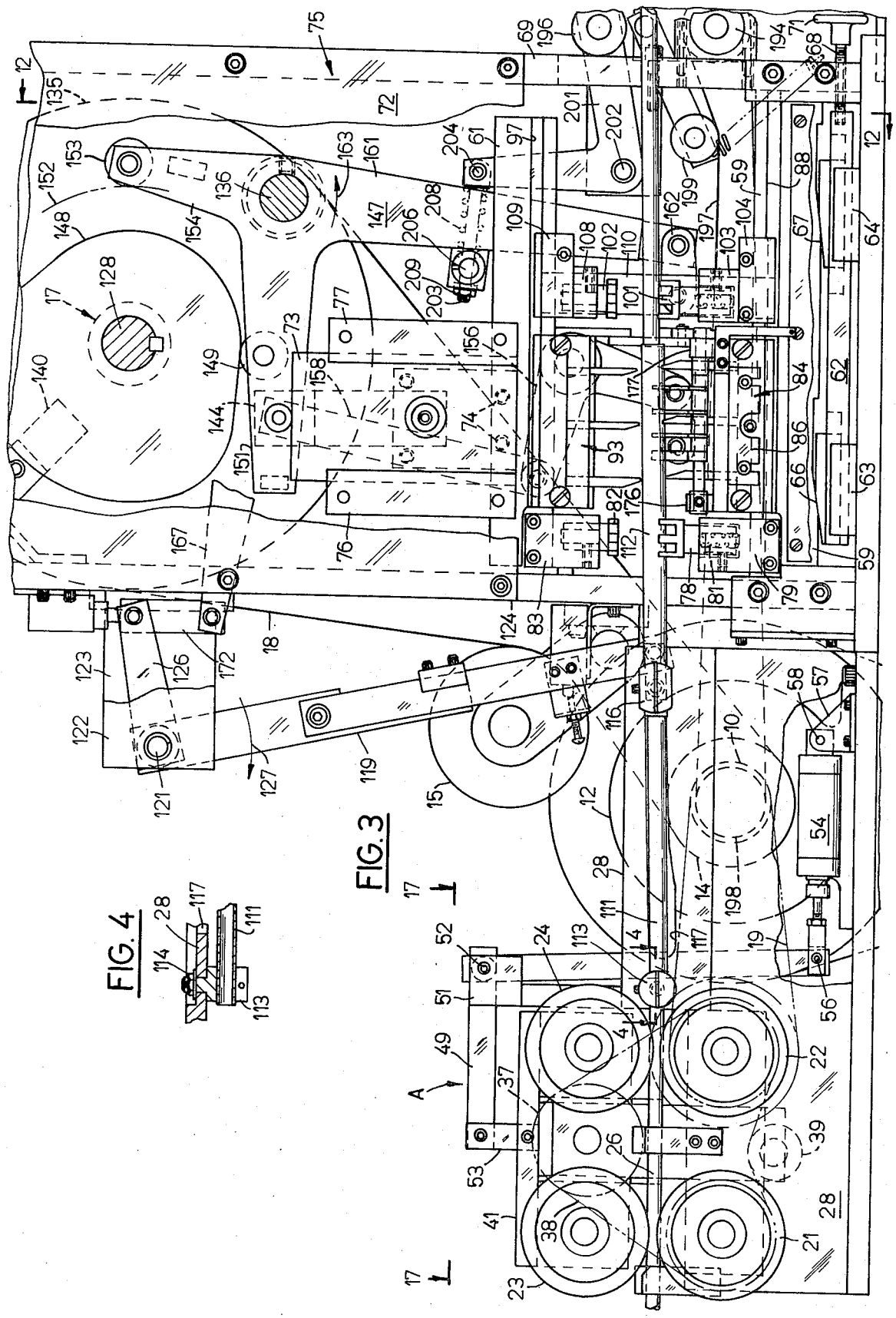

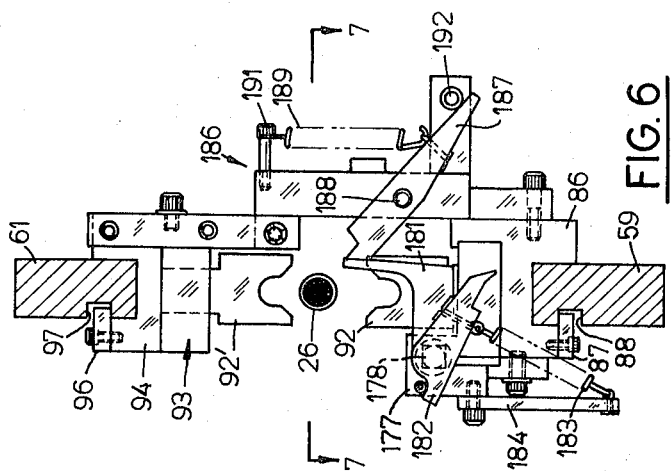
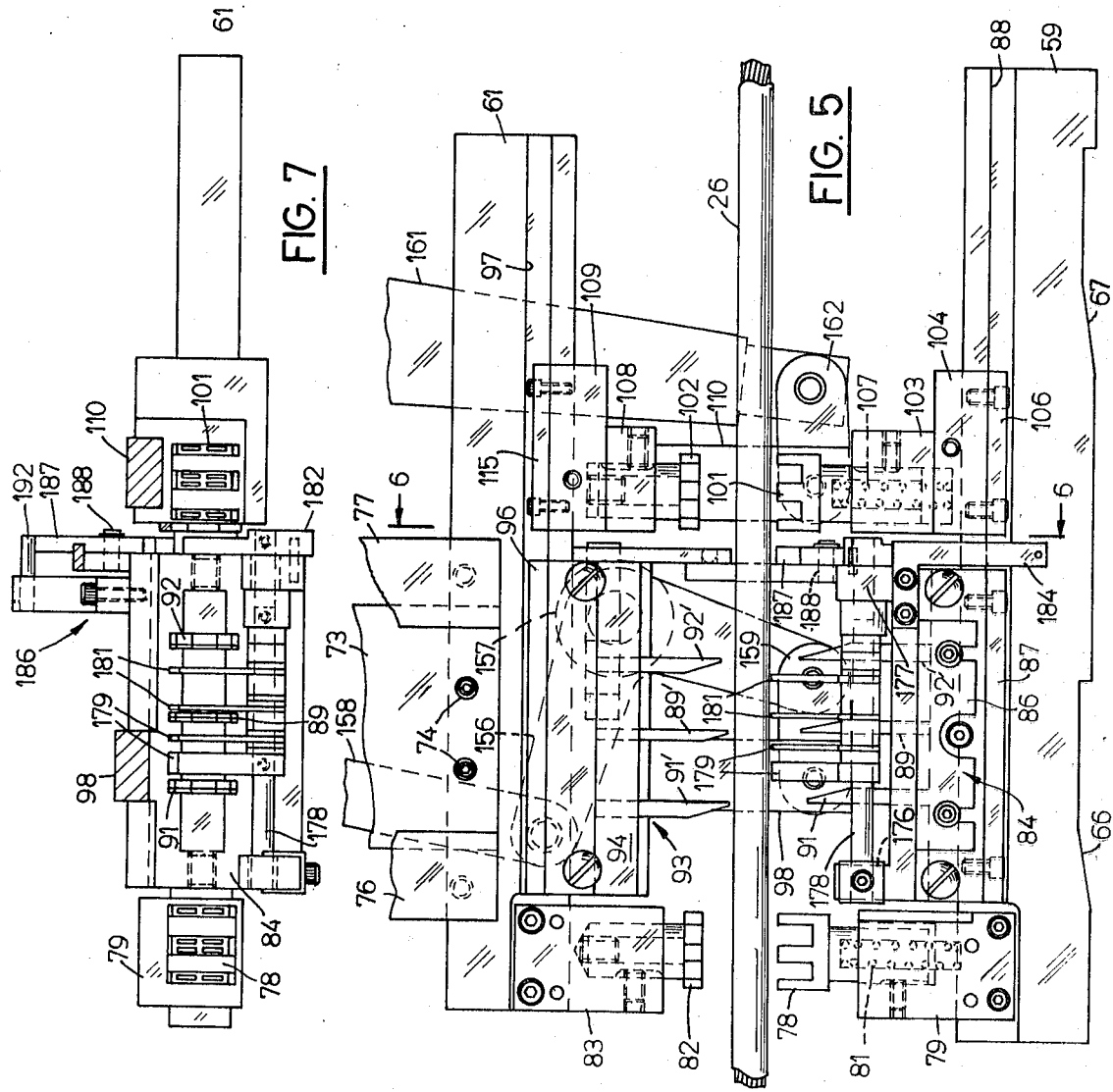

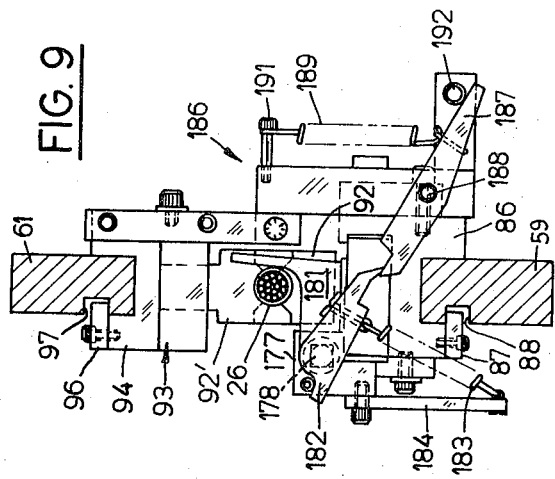
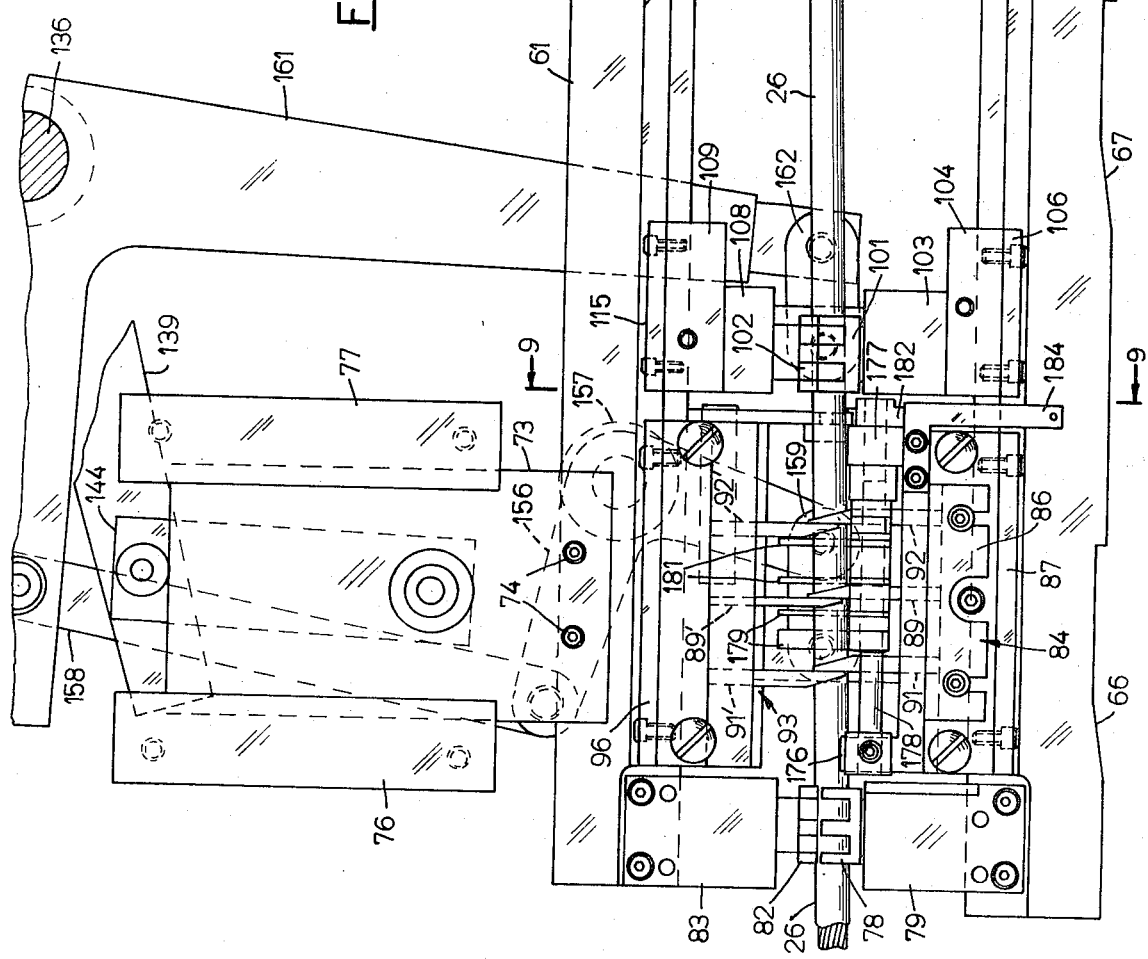

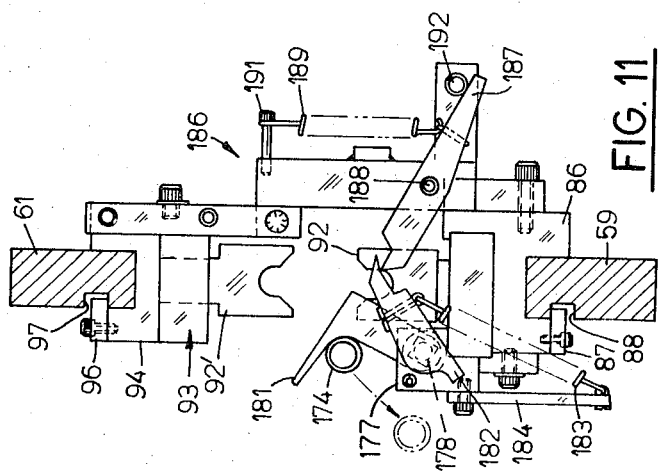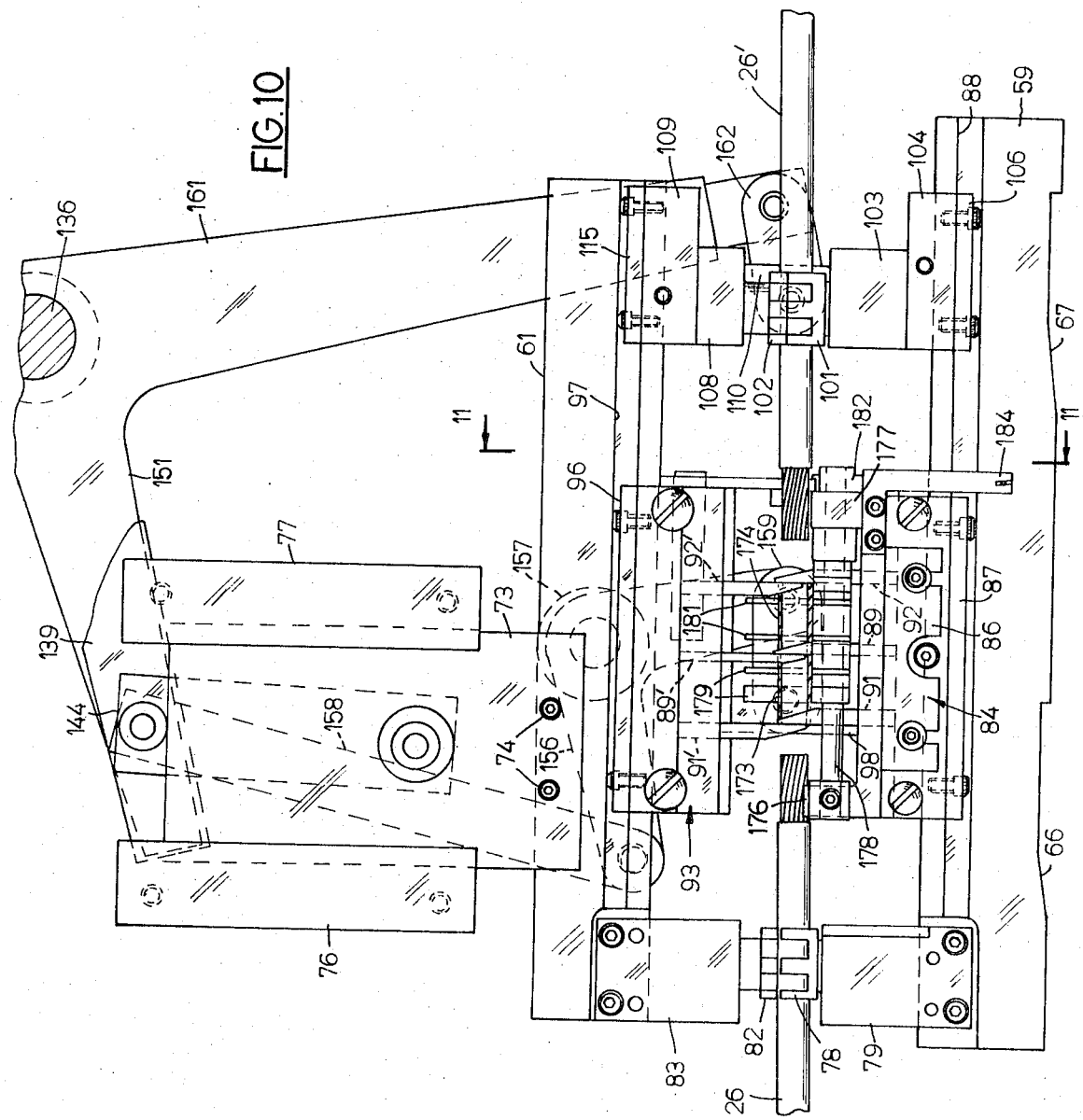

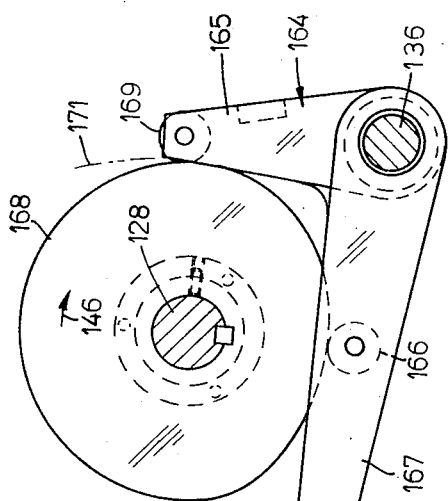
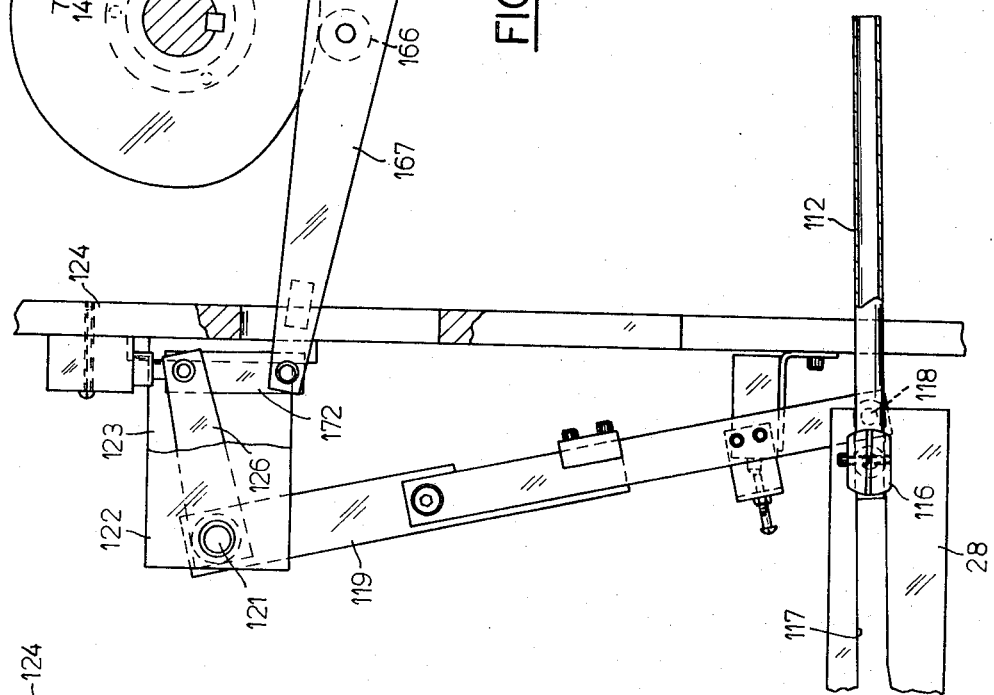
FIG.15
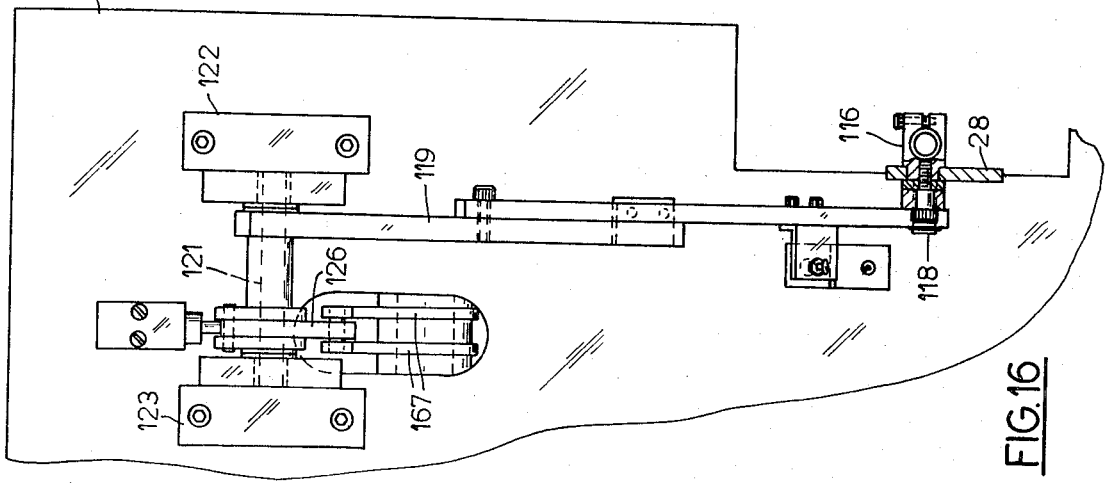
FIG.16

CABLE CUTTING AND STRIPPING MACHINE

BACKGROUND OF THE INVENTION

The invention has to do with the cutting of successive lengths of electrical cable from a supply reel and with the double stripping of the severed calbe lengths, that is, removing short pieces of insulation from both ends of each severed cable length.

Machines have heretofore been developed for automatically producing double stripped electrical wire lengths. A common practice in this connection has been to play out insulated electrical wire stock from a supply reel progressively through an open stock gripping clamp, through an open pair of complementary cutter heads, and through an open severed wire gripping clamp. By closing both gripping clamps of such prior art machines, the stock thus played out is firmly gripped at a place in back of the closed cutter heads and at another place ahead of the closed cutter heads; and at the same time the desired length of wire is severed from the stock by closing of the cutter heads which also cut into the insulation in back and in front of the place of severance. Stripping of the cut insulation from the leading end of the remaining stock is then effected by retracting the closed stock gripping clamp rearwardly away from the closed stationary pair of cutter heads, and stripping of insulation from the trailing end of the severed wire length is effected by retracting the closed severed wire gripping clamp forwardly away from the stationary closed pair of cutter heads.

Prior art wire cutting and stripping machines constructed in line with the above outlined principles of operation have been entirely satisfactory to produce double stripped wire leads of any desired length in large quantities and at a high rate of speed. However, such machines as heretofore constructed have not been very well adapted for cutting and stripping accurately measured lengths of relatively heavy electrical cable, such as are required in large quantities by the automotive industry for battery cables. In order to measure the length of the stock which is played out from the supply reel and delivered to a cutting and stripping machine of the mentioned type a feeding device must be provided, and such feeding device is usually arranged at a relatively short distance in back of the stock gripping clamps. After the desired length of stock has been played out, the feeding device not only stops feeding but it also keeps the stock firmly gripped and prevents it from shifting lengthwise in either direction. During the stripping operation the stock gripping clamp, as stated, is retracted rearwardly from the closed stationary cutter heads, that is, in the direction toward the feeding device. That means that when the stock gripping clamp retracts from the closed cutter heads during stripping, the length of stock between the feeding device and the receding stock gripping clamp must buckle. Such buckling of the stock presents no problem if the stock is relatively light and flexible, but if it is of heavy gauge and relatively stiff, such as battery cable, it will objectionally obstruct the receding movement of the stock gripping clamp from the stationary closed cutter heads. As a result, either the stock gripping clamp may slip and fail to strip, or the stock may slip backward through the feeding device and on the next feeding cycle the played out cable stock would be short of its desired length.

Another procedure which has heretofore been suggested for the production of double stripped wire lengths involves a machine which plays out measured lengths of wire stock by means of a pair of feed rollers and which picks up the played out wire stock by means of a rotating assembly of cutting blades and cut wire gripping jaws. Rotation of the cutting blades with the gripped wire stock causes stripping of insulation from the free end of the remaining stock, and the feed rollers are relied upon to resist the stripping pull. A machine of this type is believed to be not entirely satisfactory in various respects, as from a manufacturing and performance standpoint and particularly with respect to the production of wire leads of highly accurate length.

SUMMARY OF THE INVENTION

The present invention provides an improved wire cutting and stripping machine which will automatically produce double stripped electrical conductors of any desired length in large quantities and at a high rate of speed, but wherein the wire stock is not subject to buckling during the stripping operation. In other words, the improved wire cutting and stripping machine incorporating the invention is not limited to use of relatively light wire stock, as the mentioned prior art machines, but it will also properly and efficiently handle relatively heavy wire stock such as required for battery cables and other heavy duty uses.

With the stated end in view, the invention contemplates an improved cable cutting and stripping machine which generally incorporates four principal components, namely a wire stock feeding device; wire stock clamping means; a horizontally back and forth movable multiple blade cutter assembly; and horizontally back and forth movable cut cable gripping means. The cutter assembly is located between the stock clamping means and the cut cable gripping means and comprises three pair of horizontally spaced complementary cutting blades, one pair of severing the desired cable length from stock, and the other two pairs for cutting into or scoring the insulation at opposite sides of the place of severance.

In operation of the improved machine, a predetermined length of cable stock is played out from a supply reel by the feeding device through the open cable clamping and gripping means and through the open cutter assembly while the latter is in a rearwardly adjusted position next to the cable clamping means and while the cut cable gripping means are in a rearwardly adjusted position next to the rearwardly adjusted cutter assembly.

During the next phase of the operating cycle of the machine, the stock clamping means, the rearwardly adjusted cutter assembly and the rearwardly adjusted cut cable gripping means are closed. As a result of the closing operation the played out stock is firmly gripped by the stock clamping means and is thereby secured against lengthwise forward and rearward shifting; the cutter assembly severs the desired cable length from the secured stock and cuts into the insulation at the free end of the remaining stock as well as into the insulation at the trailing end of the cut cable length preparatory to stripping.

During the next phase of the operating cycle the closed cutter assembly is retracted forwardly away from the closed stock clamping means and at the same time the closed cable gripping means are retracted forwardly from the forwardly moving closed cutter assembly. As a result of such differential forward movement of the cutter assembly and of the cut cable gripping means the insulation which has been cut or scored by the closing of the cutter assembly is stripped from the free end of the remaining stock and also from the trailing end of the cut cable length.

During the next phase of the operating cycle, the stock clamping means, the cutter assembly and the cut cable gripping means are opened, and the cutter assembly as well as the cut cable gripping means are restored to their rearwardly adjusted open positions.

During its next full operating cycle, the machine will then produce a double stripped cable length, that is, cable length from which a short length of insulation has been stripped at both ends.

In addition to the hereinbefore outlined principal components of the improved cable cutting and stripping machine, the invention contemplates the addition of several supplemental or auxiliary mechanisms to the machine. One of such auxiliary mechanisms comprises a cable guide tube which is reciprocably mounted at the inlet end of the machine for endwise forward shifting movement into a projected position between the open stock clamping means and the open rearwardly retracted cutter assembly, and for endwise rearward shifting movement into a retracted position in back of the open stock clamping means. While the guide tube is in its forwardly shifted position cable stock is passed through it and emerges from its forward end through the open rearwardly adjusted cut cable gripping means. After the desired length of cable stock has been played out from the supply reel the cable guide tube is retracted to its rearwardly shifted position and the machine then proceeds to sever a desired cable length from the stock and strip it as outlined hereinbefore.

Another auxiliary mechanism contemplated by the invention comprises an ejector for removing the insulation strippings from the cutter assembly.

A further auxiliary mechanism contemplated by the invention comprises a pair of feed rollers for discharging the severed and stripped cable lengths from the machine.

A still further auxiliary mechanism contemplated by the invention is combined with the back and forth movable cutter assembly and provides for adjustment of the depth to which the cable insulation is scored preparatory to stripping.

The foregoing and other features and advantages of the invention will become more fully apparent from the following description of a preferred embodiment shown in the accompanying drawings.

DRAWINGS

FIG. 3 is an enlarged view of part of the machine shown in FIG. 1 with housing portions broken away and illustrating a first phase of the operating cycle;

FIG. 4 is a sectional detail view on line 4—4 of FIG. 3;

FIG. 5 is an enlarged view of a portion of FIG. 3 illustrating a second phase of the operating cycle;

FIG. 6 is a section on line 6—6 of FIG. 5;

FIG. 7 is a section on line 7—7 of FIG. 6;

FIG. 8 is a view similar to FIG. 5 and illustrating a third phase of the operating cycle;

FIG. 9 is a section on line 9—9 of FIG. 8;

FIG. 10 is a view similar to FIG. 5 and illustrating a fourth phase of the operating cycle;

FIG. 11 is a section on line 11—11 of FIG. 10;

FIG. 15 is a section on line 15—15 of FIG. 12;

FIG. 16 is an end view of FIG. 15 with parts broken away and shown in section;

DETAILED DESCRIPTION

Figure 1:
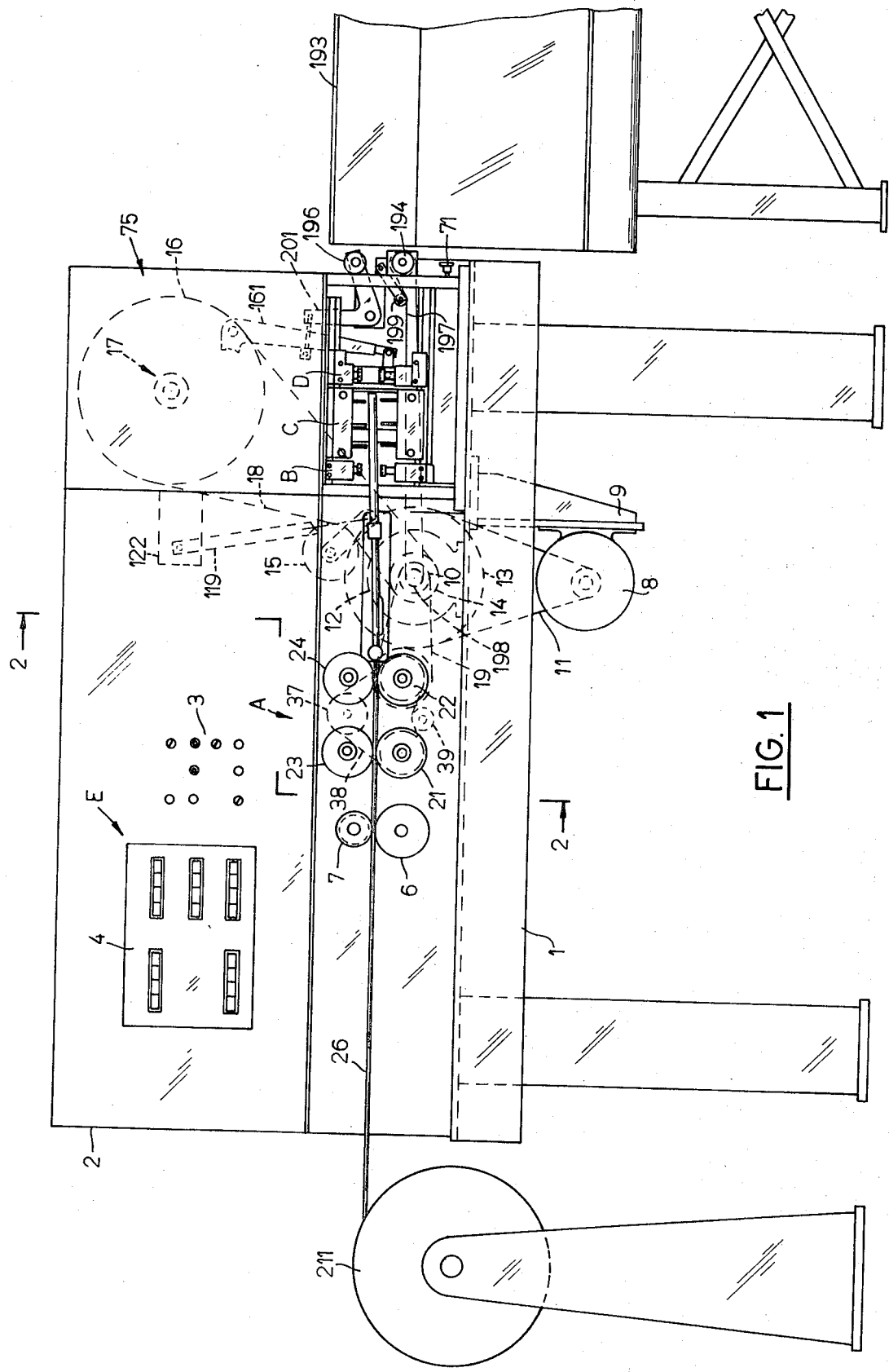
FIG. 1 is an elevational front view of a cable cutting and stripping machine embodying the invention.

The main frame 1 of the machine as shown in FIG. 1, extends lengthwise between opposite ends thereof and mounts the hereinbefore mentioned four principal components, namely, a wire stock feeding device adjacent to one end of said frame and generally designated by the reference character A, wire stock clamping means B operatively mounted on said frame between said stock feeding means and the other end of said frame at a predetermined distance from said feeding means, wire stock cutting C operatively mounted on said frame between said clamping means and said other end of said frame in lengthwise back and forth shiftable relation thereto, and cut wire gripping means D operatively mounted on said frame between said wire stock cutting means and said other end of said frame in lengthwise shiftable relation thereto. In addition to these principal components, the machine includes a computerized measuring device E for the wire lengths that are played out by the feeding device A. The measuring device E is enclosed in a housing assembly 2 and includes a number of control buttons 3, an indicator panel 4 and a shaft encoder comprising a measuring roller 6 and a pressure roller 7.

Figure 2:
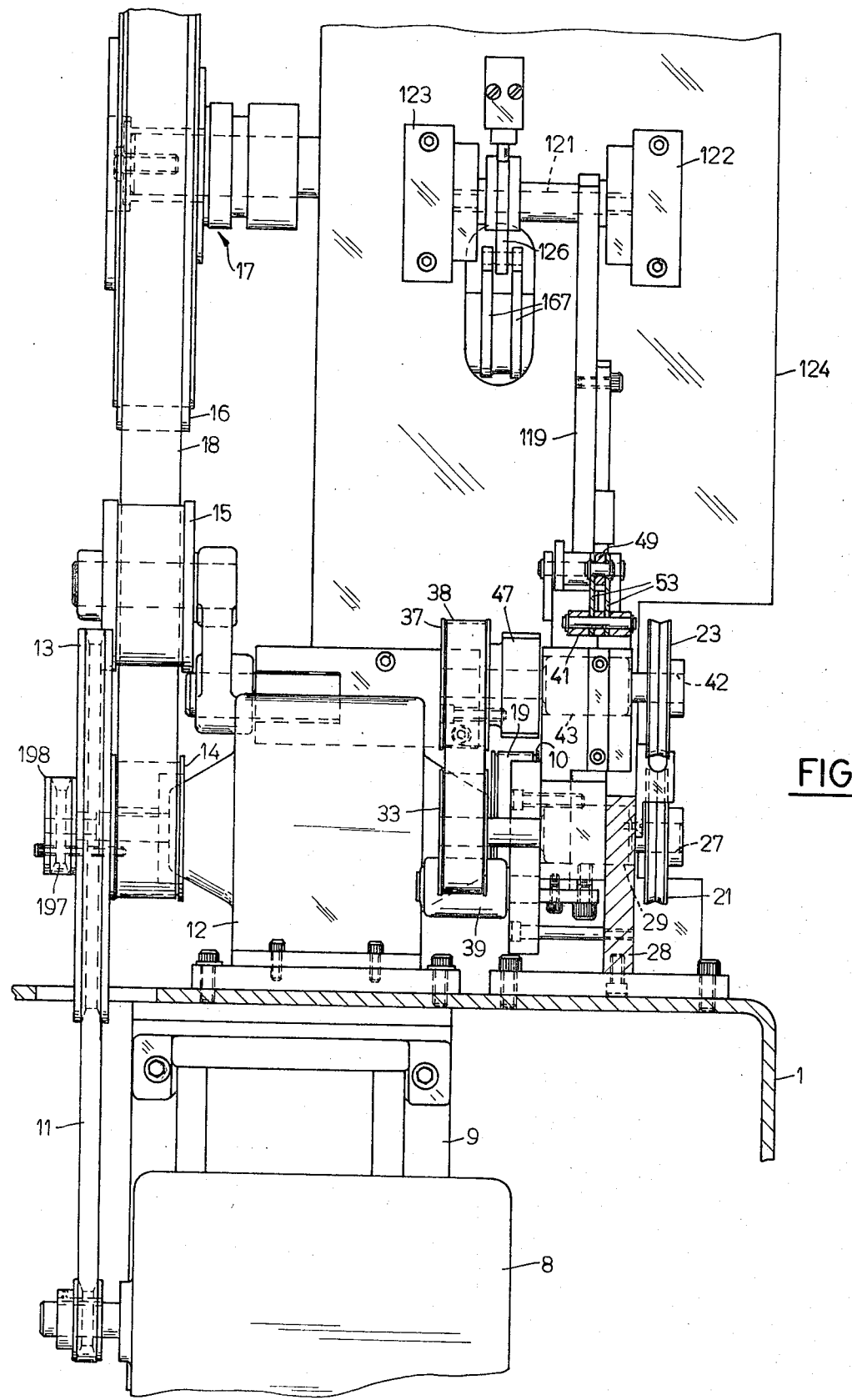
FIG. 2 is a sectional view on line 2—2 of FIG. 1.

Operating power for the machine is supplied by an electric motor 8 supported by a depending bracket 9 on the main frame 1. A belt 11 connects the motor 8 with a clutch and brake unit 12 which is mounted on frame 1 between the feeding device A and the clamping means B. As shown in FIG. 2, the belt 11 is trained about a large diameter belt pulley 13 which is mounted on the input shaft of the unit 12. Another belt pulley 14 on the input shaft of the unit 12 is connected with a pulley 16 on a one-revolution clutch 17 by a belt 18 to transmit operating power to the units B, C and D as will be explained later. A tensioning roller 15 bears upon the belt 18 between the pulleys 14 and 16.

The clutch and brake unit 12 is a commercially available article and includes an electrically controlled clutch (not shown) for selectively establishing and interrupting a driving connection between the input and output shafts of the unit, and an automatic brake mechanism (not shown) for locking the output shaft against rotation upon its disengagement from the input shaft.

THE WIRE FEEDING DEVICE

Figure 18:
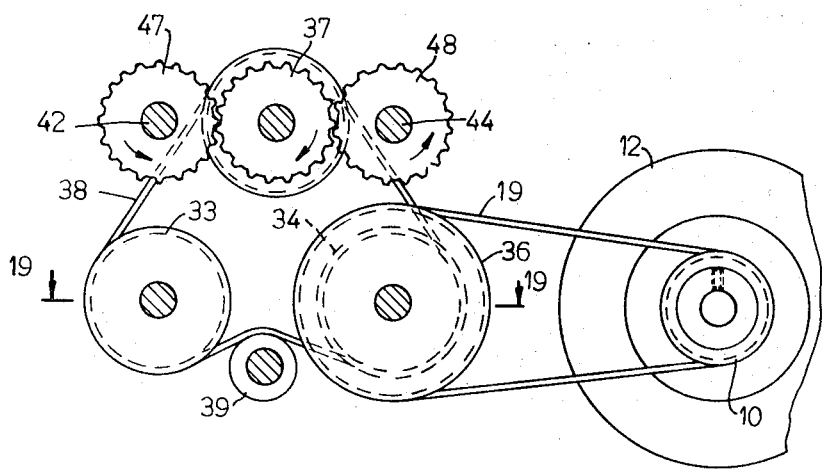
FIG. 18 is a section on line 18—18 of FIG. 17.
Figure 19:
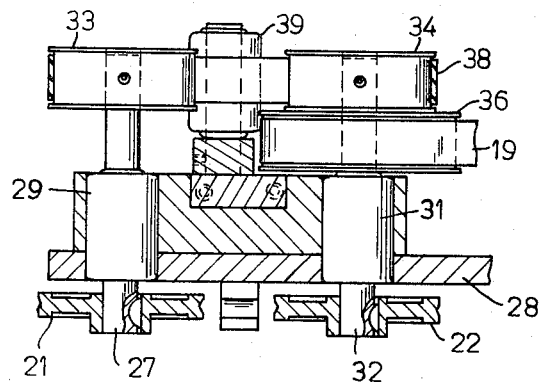
FIG. 19 is a section on line 19—19 of FIG. 18.

The wire feeding device A is shown in detail in FIGS. 3 and 17–19. It comprises a pair of radially spaced wire stock supporting rollers 21 and 22, a pair of radially spaced clamping rollers 23 and 24 in lateral pressure exerting relation to wire stock 26 extending over the supporting rollers 21 and 22. As shown in FIG. 19, the roller 21 is keyed to a shaft 27 which is rotatably mounted on a wall structure 28 of the machine frame by means of a bearing unit 29. The roller 22 is similarly mounted on the wall structure 28 by means of a bearing unit 31 supporting a drive shaft 32 for the roller 22. The shafts 27 and 32 project from the wall structure 28 into the housing assembly 2 and belt pulleys 33 and 34 are non-rotatably secured to the projecting ends of the shafts 27 and 32. The shaft 32 further carries a belt pulley 36 between the wall structure 28 and the pulley 34, the pulley 36 being driven by the output shaft 10 of the unit 12 my means of the belt 19 as shown in FIG. 1. Also mounted on the wall structure 38 above the rollers 21 and 22 is a compound pulley and gear roller 37 as shown in FIGS. 1 and 18. An endless belt 38 is trained around the belt pulleys 33, 34 and the pulley section of the compound roller 37 so that driving power transmitted to the belt pulleys 34 and 36 on shaft 32 by the belt 19 will also be transmitted to the compound roller 37 and the belt pulley 33. The pitch diameters of the belt pulleys 33,34 and of the pulley section of the compound roller 37 are the same and the lower rollers 21 and 22 are therefore being driven at the same speed by rotation of the shaft 32. An idler roller 39 in engagement with the belt end 38 is mounted on the wall structure 28 in up and down adjustable relation to the belt pulleys 33 and 34 so as to maintain proper tension of the endless belt 38.

The upper rollers 23 and 24 are mounted on a yoke 41 (FIG. 3) which is slidably mounted on the wall structure 28 for up and down adjustment relative to the lower rollers 21 and 22. The upper roller 23 is keyed to a shaft 42 (FIG. 17) which is rotatably supported on the yoke 41 by means of a bearing unit 43, and the roller 24 (FIG. 3) is keyed to a shaft 44 (FIG. 17) which is rotatably mounted on the yoke 41 by means of a bearing unit 46. The shafts 42 and 44 project from the wall structure 28 into the housing assembly 2 and gear wheels 47 and 48 are non-rotatably secured to the inwardly projecting ends of the shafts 42 and 44, respectively. The gear wheels 47 and 48 mesh with the gear section of the compound roller 37 so that they will rotate in unison with each other when the compound roller is driven by the belt 38. The gear connections of the upper rollers 23 and 24 and the compound roller 37 permit up and down adjustment of the yoke 41 relative to the compound roller 37 which is mounted on the wall structure 28 in radially fixed relation to the lower rollers 21 and 22.

A raising and lowering mechanism for the yoke 41 comprises a bell crank lever 49 (FIG. 3) which is pivotally supported on a bracket extension 51 of the wall structure 28 by means of a pivot pin 52. One arm of the bell crank lever 49 is hinged to the yoke 41 by means of a link 53 and the other arm of the bell crank lever 49 is connected to a pneumatic cylinder 54 on the frame of the machine. The piston rod of the cylinder 54 is connected to the depending arm of the bell crank lever 49 by means of a pivot pin 56, and at its barrel end the cylinder 54 is pivotally connected to a bracket 57 on the machine frame by means of a pivot pin 58. Admission of air pressure to the barrel end of the cylinder 54 by means of an electrically controlled pneumatic circuit (not shown) adjusts the yoke 41 upward and lifts the pressure rollers 23 and 24 from wire stock extending over the supporting rollers 21 and 22. On the other end, admission of air pressure to the gland end of the cylinder 54 lowers the yoke 41 and causes the pressure rollers 23 and 24 to bear upon the wire stock supported by the lower rollers 21 and 22.

WIRE STOCK CLAMPING MEANS

As shown in FIGS. 3, 5, 8 and 10, a lower tool supporting rail 59 and an upper tool supporting rail 61 are operatively mounted on the machine frame in reciprocable relation to each other. The lower rail 59 is seated on an underlying shift bar 62 (FIG. 3) which in turn is seated in a pair of channel brackets 63 and 64 on the machine frame. The tool supporting rail 59 and the shift bar 62 are provided with tapered seating surfaces 66 and 67 by means of which the tool supporting rail 59 may be adjusted up and down when the shift bar 62 is moved endwise back and forth. An adjusting screw 68 for the shift bar 62 is rotatably connected with the shift bar 62 and is threadedly mounted in a vertical wall member 69 of the machine frame. A hand wheel 71 on the adjusting screw 68 may be turned back and forth manually in order to slide the shift bar 62 back and forth in the mounting brackets 63 and 64 thereby raise and lower the tool supporting rail 59 on the machine frame.

The upper tool supporting rail 61 is slideably mounted for up and down movement on a vertical wall member 72 (FIG. 12) of a housing assembly 75 (FIG. 1) on the main frame 1. A slide block 73 at the inner side of the wall member 72, is connected to the rail 61 by screws 74 and guided on the wall member 72 by gibs 76 and 77 (FIG. 3). At the end of the lower tool supporting rail 59 next to the wire feeding device A, a wire clamping jaw 78 is positioned in a socket member 79 on the rail 59. A coil spring 81 within the socket member 79 resiliently supports the clamping jaw 78 in a vertical position. A complementary clamping jaw 82 opposite to the clamping jaw 78 is seated in a socket member 83 on the upper rail 61. The upper clamping jaw 82 has a threaded stem within the socket member 83 for vertical up and down adjustment relative thereto.

FIGS. 3 and 5 show the clamping jaws 78 and 82 in an open position from which they can be moved into a closed stock engaging position as shown in FIGS. 8 and 10 by means of a cam controlled linkage mechanism which will be explained more fully later.

A lower cutting blade assembly 84 is slideably mounted on the lower tool supporting rail 59 for back and forth movement in a horizontal direction. As shown in FIGS. 5, 6 and 7, the blade assembly 84 comprises a blade mounting structure 86 which straddles the rail 59 and is provided at its lower end with a tongue 87 in cooperative engagement with a longitudinal groove 88 in the rail 59. Fixedly secured in the blade mounting structure 86 are three laterally spaced cutting blades 89, 91 and 92, the blade 89 being a wire cutting blade and the blades 91 and 92 being insulation cutting blades.

An upper cutting blade assembly 93 opposite and complementary to the lower cutting blade assembly 84 is mounted on the upper tool supporting rail 61 for horizontal back and forth shifting movement. As shown in FIG. 6, the upper blade assembly 93 has a blade mounting structure 94 which is connected to the rail 61 in a depending position by means of a tongue 96 in cooperative engagement with a longitudinal groove 97 in the rail 61. Like the lower blade assembly 84, the upper blade assembly 93 has three cutting blades 89', 91' and 92' which are fixedly retained in the mounting structure 94 in laterally spaced relation to each other. As shown in FIGS. 5 and 7, the lower blade assembly 84 and the upper blade assembly 93 are tied together for unitary back and forth movement along the rails 59 and 61 by means of a connecting bar 98 which is ridigly secured to the blade mounting structure 94 of the blade assembly 93 and which extends through a vertical recess in the blade mounting structure 86 of the assembly 84 in up and down movable relation thereto.

FIG. 3 shows the lower and upper blade assemblies 84 and 93 in an open condition from which they are moved into the closed position shown in FIGS. 8 and 10 by translatory downward movement of the rail 61 towards the rail 59. Unitary horizontal back and forth shifting of the upper and lower blade assemblies 84 and 93 along the rails 61 and 59 is accomplished by means of cam controlled link mechanism to be described later.

THE CUT WIRE GRIPPING MEANS

In addition to the wire stock clamping jaws 78 and 82, and the wire cutting assemblies 84 and 93, the tool supporting rails 59 and 61 mount a pair of horizontally back and forth shiftable cut wire gripping jaws 101 and 102. The lower gripping jaw 101 is seated in a socket 103 which is connected to a slide block 104 as shown in FIG. 5. The slide block 104 has a tongue plate 106 like the tongue plate 87 of the cutting blade assembly 84 in cooperative engagement with the groove 88 of the rail 59. The lower gripping jaw 101 is resiliently supported by a coil spring 107 in a vertical position within the socket 103.

The upper gripping jaw 102 has a threaded stem in a socket 108 which is connected to a slide block 109 of the upper rail 61 by a tongue 115. The threaded stem of the upper gripping jaw 102 provides for vertical up and down adjustment of the jaw 102 relative to the socket 108.

Like the cutting assemblies 84 and 93, the gripping jaws 101 and 102 are tied together for unitary back and forth movement along the supporting rails 59 and 61. For that purpose, a connecting bar 110 is secured at its upper end to the slide block 109 and has a vertical sliding connection with the slide block 104 on the lower rail 59. Downward movement of the upper rail 61 from the position shown in FIGS. 3 and 5 to the lower position in which it is shown in FIGS. 8 and 10 brings the gripping jaws into engagement with the wire stock which has been played out by the wire feeding device A.

A cam operated linkage mechanism for reciprocating the gripping jaws 101 and 102 longitudinally of the rails 59 and 61 relative to the cutting assemblies 84 and 93 is operatively connected to the connecting bar 110 as will be described later.

THE WIRE GUIDE TUBE ASSEMBLY

The wire stock which is played out by the feeding device A is advanced into a guide tube assembly which comprise a pair of telescopably interconnected inner and outer tube members 111 and 112 (FIG. 3). As shown in FIG. 4, the inner tube 111 is mounted on the wall structure 28 of the housing assembly 2 for pivotal up and down movement by means of a swivel block 113. A stud portion of the swivel block 113 is rotatably fitted into a bore of the wall structure 28 and is retained thereon by a nut 114. The outer tube 112 as shown in FIGS. 15 and 16 is mounted in a clamping block 116 which is reciprocably guided in a slot 117 of the wall structure 28. The clamping block 116 has a stud 118 (FIG. 16) at the inner side of the wall structure 28 by means of which the block 116 is pivotally connected to a rocker arm 119 which is swingable on a cross shaft 121 supported in a pair of bearing blocks 122 and 123 of a vertical wall 124 of the housing assembly 75 on the main frame 1. An actuating arm 126 for the rocker arm 119 is secured to and extends radially from the cross shaft 121. Back and forth swinging movement is transmitted to the rocker arm 119 by a cam operated linkage mechanism which will be described herein below and by means of which the outer tube 112 is moved back and forth along the stationary inner tube 111. In the position of the rocker arm 119 as shown in FIG. 3, the tube 112 is projected into the space between the lower and upper tool assemblies on the supporting rails 59 and 61. From its projected position the tube 112 is retracted out of the space between the tool assemblies by swinging movement of the arm 119 about the axis of the shaft 121 in a clockwise direction as indicated by the arrow 127 in FIG. 3.

THE CAM ACTUATED LINKAGE MECHANISMS

The mechanism for moving the upper tool supporting rail 61 up and down as well as the mechanism for reciprocating the cutting knife assemblies 84 and 93 and the gripping jaws 101 and 102 are operated by rotation of a cam shaft 128 (FIG. 12) which is rotatably supported at its opposite ends on the wall member 72 and on an opposite wall member 129 of the housing assembly 75. At the outer side of the housing wall 129, the one-revolution clutch 17 is mounted on a projecting end of the cam shaft 128. The construction and operation of the clutch 17 conform with engineering principles which are described in U.S. Pat. No. 3,653,412, issued Apr. 4, 1972 to Ragnar Gudmestad for Conveyor Transfer Unit. Briefly, the clutch includes a control lever 131 which is operable by a solenoid 132 in order to initiate an operating cycle of the clutch. An electrical tripping signal momentarily transmitted to the solenoid causes the cam shaft 128 to be connected to the input pulley 133 of the clutch which then rotates through one full revolution and thereupon automatically disengages the cam shaft 128 from the input pulley 133. A brake disc 135 on the cam shaft 128 is straddled by a stationary pair of friction pads 140 which instantly stop rotation of the cam shaft when it is disconnected from the input pulley 133 of the clutch 17.

Figure 12:
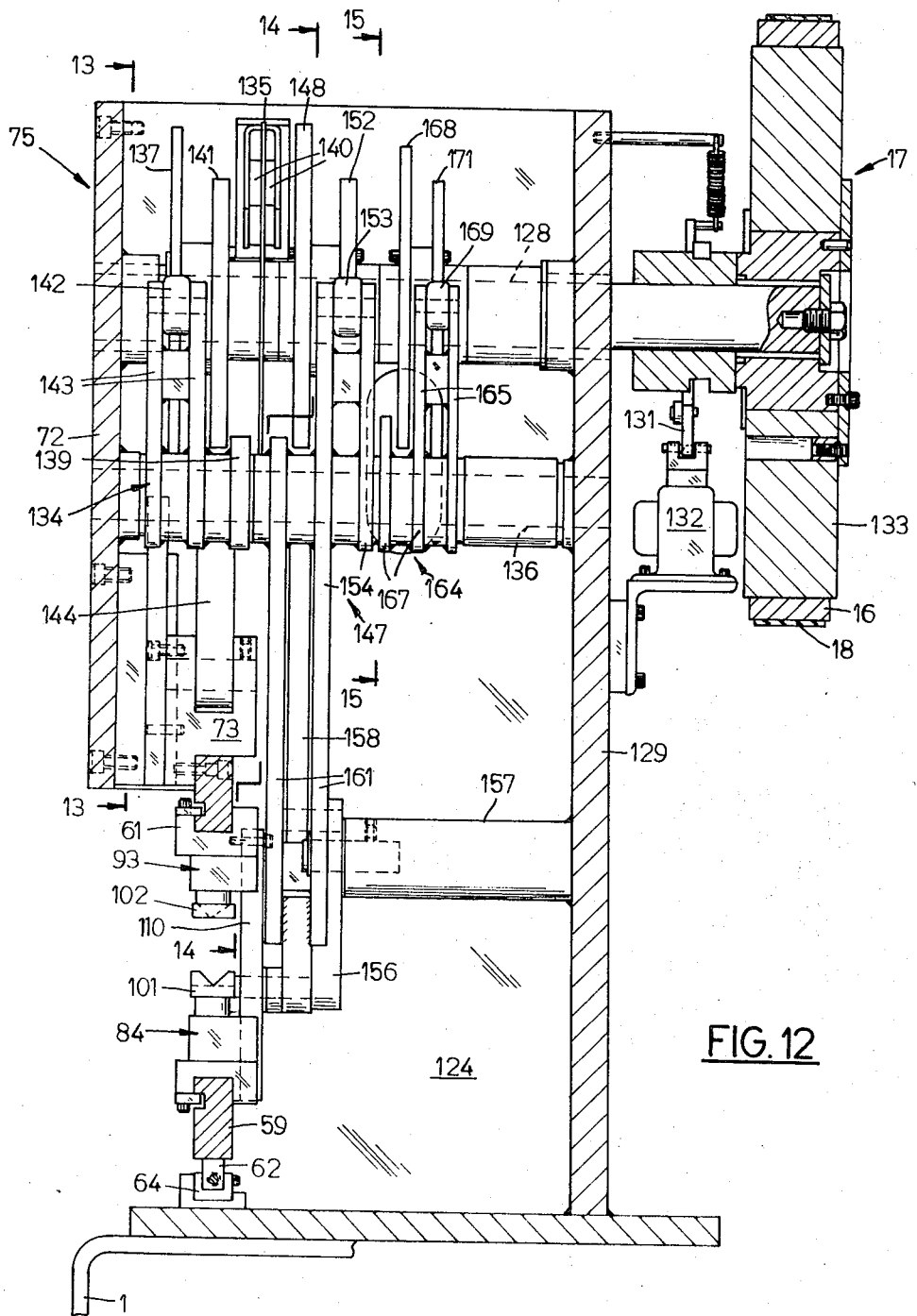
FIG. 12 is a section on line 12—12 of FIG. 3 with parts broken away and shown in section.
Figure 13:
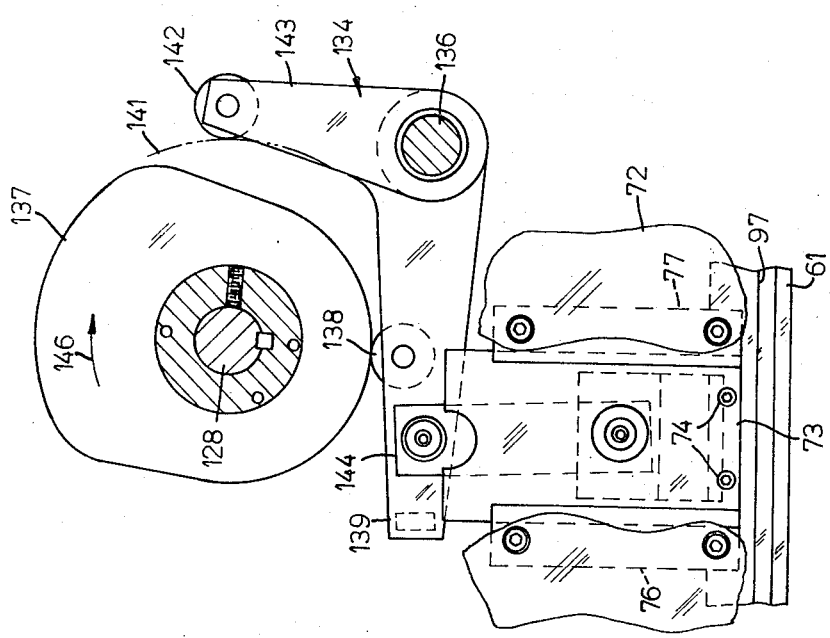
FIG. 13 is a section on line 13—13 of FIG. 12.
Figure 17:
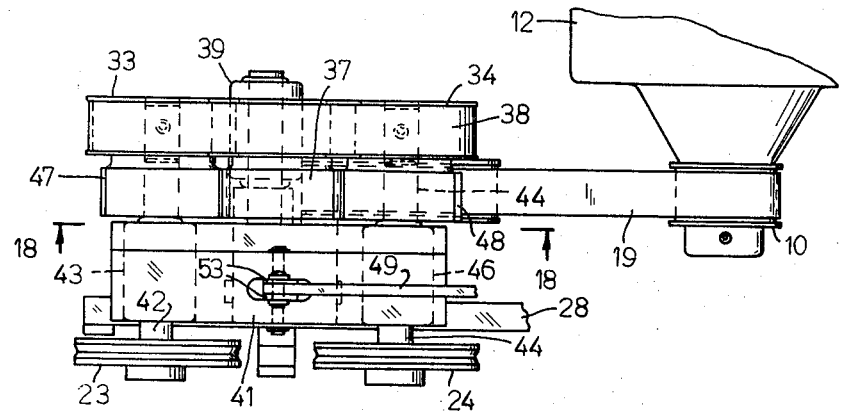
FIG. 17 is a partial top view on line 17—17 of FIG. 3.

The cam operated linkage mechanism for moving the tool supporting rail 61 up and down relative to the tool supporting rail 59 is shown in FIGS. 12 and 13. It comprises a rocker arm assembly 134 which is pivotally mounted on a cross shaft 136 between the housing walls 72 and 129. An actuating cam 137 on the cam shaft 128 cooperates with a cam follower roller 138 which is pivotally supported between a pair of radial arms 139 of the rocker assembly 134. Another cam disc 141 which is rotated in unison with the cam disc 137 by the cam shaft 128 cooperates with a cam follower roller 142 between a pair of radial arms 143 of the rocker assembly 134. The cam discs 137 and 141 are properly contoured so that the rollers 138 and 142 will remain continuously in contact with the cam discs during rotation of the cam shaft 128. The vertical slide block 73 which is secured to the upper tool supporting rail 61 is connected to the radial arms 139 of the rocker arm assembly 134 by a link 144. FIGS. 12 and 13 show the tool supporting rail 61 in its raised limit position and rotation of the cam shaft 128 in the direction of arrow 146 through one revolution will sequentially lower the rail 61 to its lowered limit position and then raise it again to its upper limit position.

Figure 14:
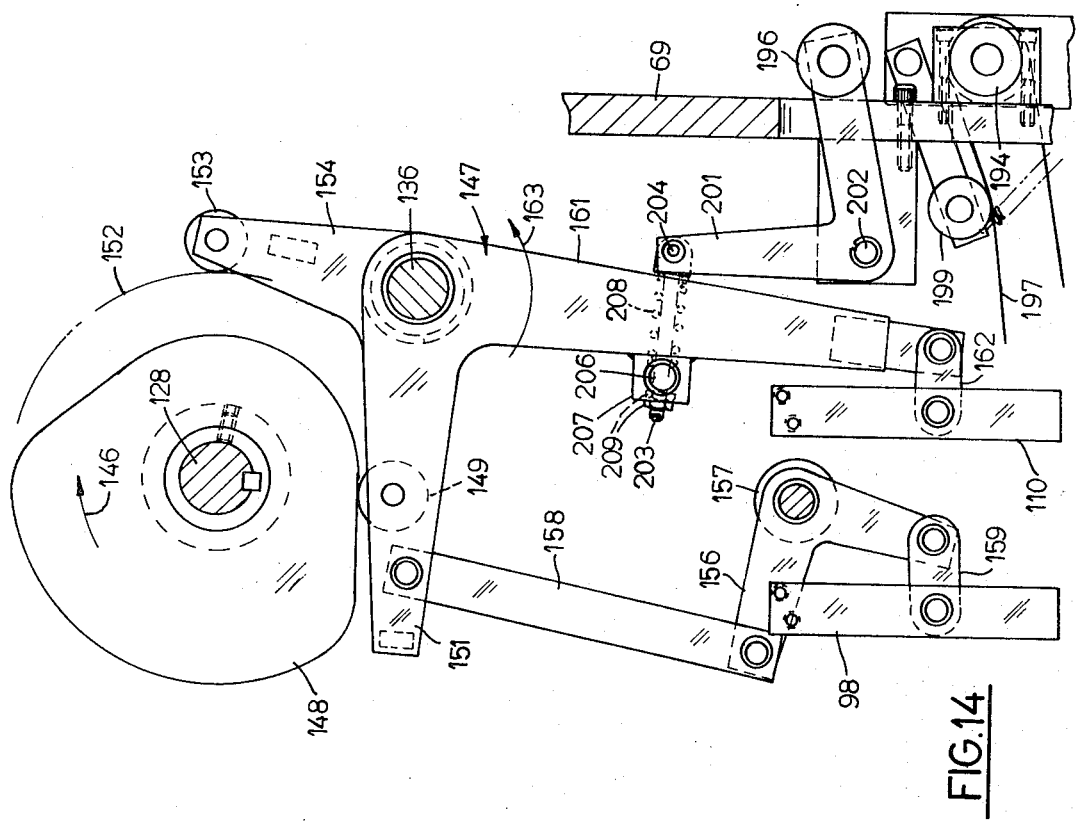
FIG. 14 is a section on line 14—14 of FIG. 12.

The cam operated linkage mechanism for reciprocating the cutting blade assemblies 84 and 93 and the gripping jaws 101 and 102 back and forth along the tool supporting rails 59 and 61 is shown in FIGS. 12 and 14. It comprises a rocker arm assembly 147 which is pivotally mounted on the cross shaft 136 next to the rocker arm assembly 134. A cam disc 148 on the cam shaft 128 cooperates with a cam follower roller 149 between a pair of radial arms 151 of the rocker arm assembly 147. Another can disc 152, which is rotated in unison with the cam disc 148 by the cam shaft 128 cooperates with a cam follower roller 153 between a pair of arms 154 of the rocker arm assembly 147. The cam discs 148 and 152 are suitably contoured so that the cam follower rollers 149 and 153 will stay continuously in contact therewith during a complete revolution of the cam shaft 128 and swing the rocker arm assembly 147 back and forth about the axis of the cross shaft 136.

A bell crank lever 156 is pivotally mounted on a cylindrical stud 157 (FIG. 12) which extends inwardly from the housing wall 129. One arm of the bell crank lever 156 is connected to the radial arms 151 of the rocker arm assembly 147 by means of a link 158 and the other arm of the bell crank lever 156 is connected to the connecting bar 98 between the upper and lower cutting blade assemblies 93 and 84 by a link 159. As the rocker arm assembly 147 swings back and forth about the axis of the cross shaft 136, the connecting bar 98, and with it the upper and lower cutting blade assemblies 93 and 84, will therefore be shifted back and forth a predetermined distance along the lower and upper tool supporting rails 59 and 61.

The rocker arm assembly 147 has a pair of depending arms 161 which at their lower ends are hingedly connected to the connecting bar 110 between the lower and upper gripping jaws 101 and 102 by means of a link 162. When the rocker arm assembly 147 swings back and forth about the axis of the cross shaft 136, such swinging movement will therefore not only reciprocate the cutting blade assemblies along the tool supporting rails 59 and 61, but it will also reciprocate the gripping jaws 101 and 102 along the rails 59 and 61. However, the geometry of the linkage is such that the distance through which the gripping jaws are moved back and forth along the rails 59 and 61 is about twice as long as the distance through which the cutting blade assemblies are moved back and forth during the swinging movement of the rocker arm assembly 147.

In the condition of the mechanism in which it is shown in FIGS. 3 and 5, the cutting blade assemblies 84 and 93 are located in proximity to the clamping jaws 78 and 82, and the gripping jaws 101 and 102 are located in proximity to the cutting blade assemblies 84 and 93. As the cam shaft 128 rotates in the direction of arrow 146 in FIG. 14, the rocker arm assembly 147 will, after some delay, start swinging in the direction of arrow 163, and the cutting blade assemblies 84 and 93 will move away from the clamping jaws 78 and 82. At the same time, that is, while the cutting blade assemblies 84, 93 are receding from the clamping jaws 78, 82, the gripping jaws 101 and 102 will move away from the cutting assemblies 84 and 93. FIG. 10 shows the cutting blade assemblies 84 and 93 at their maximum spacing from the clamping jaws 78 and 82 and the gripping jaws 101 and 102 are shown at their maximum spacing from the cutting blade assemblies 84 and 93. Continued rotation of the cam shaft 128 in the direction of the arrow 146 (FIG. 14) will return the cutting blade assemblies 84 and 93 and the gripping jaws 101 and 102 to the starting positions in which they are shown in FIG. 3.

The cam actuated linkage mechanism for reciprocating the cable guide tube 112 along the inner guide tube 111 is shown in FIGS. 12 and 15. It comprises a rocker arm assembly 164 which is pivotally mounted on the cross shaft 136 next to the rocker arm assembly 147. A cam follower roller 166 between radial arms 167 of the rocker arm assembly 164 engages a cam disc 168 on the cam shaft 128, and another cam follower roller 169 between radial arms 165 engages a cam disc 171 (FIG. 12) which is rotated in unison with the cam disc 168 by the cam shaft 128. The cam discs 168 and 171 are suitably contoured so that the cam follower rollers 166 and 169 will continuously stay in contact therewith during a full revolution of the cam shaft 128. The actuating arm 126 for the tube shifting arm 119 is connected with the outer end of the radial arms 167 of the rocker arm assembly 164 by means of a link 172. As the cam shaft 128 rotates in the direction of arrow 146 (FIG. 15), the rocker arm assembly 164 will swing back and forth about the cross shaft 136 and as a result of such swinging of the rocker arm assembly 164, the tube 112 will be shifted backward from the projected position in which it is shown in FIGS. 3 and 15 to the retracted position in which it clears the clamping jaws 78 and 82 and then back to the projected position during a full revolution of the cam shaft 128.

THE STRIPPINGS THROW-OUT MECHANISM Z

Lowering of the tool supporting rail 61 from the position in which it is shown in FIG. 3 to the position in which it is shown in FIG. 8 causes the wire cutting blade 89' to overlap the blade 89 and cut the wire stock in two. At the same time, the stripping blades 91 and 91' cut into the insulation of the wire at the side of the cutting blades 89, 89' next to the clamping blades 78 and 82, and the stripping blades 92 and 92' cut into the insulation of wire at the side of the cutting blades 89 and 89' next to the gripping blades 101 and 102. During the next operating phase of the machine as shown in FIG. 10, the cutting assemblies 84 and 93 are pulled away from the clamping jaws 78 and 82, and the gripping jaws 101 and 102 are pulled away from the cutting blade assemblies 84 and 93. As a result of the differential movements of the cutting blade assemblies and gripping jaw assemblies, a short piece of the insulation 173 on the end of the wire stock is pulled from the metal core of the wire and is lodged in the gap between the cutting blades 89, 89' and the stripping blades 91, 91'. In a similar manner a short piece of the insulation 174 of the cut wire length 26' is pulled away from the metal core of the cut wire length and lodged in the gap between the cutting blades 89, 89' and insulation cutting blades 92, 92'. A mechanism for ejecting the insulation strippings 173 and 174 from the cutting blade assemblies is constructed as follows:

Bearing blocks 176 and 177 are secured to the lower blade mounting structure 86 and a rock shaft 178 is rotatably mounted in the blocks 176 and 177. The shaft 178 is provided with a pair of L-shaped ejector blades 179 which are swingable into and out of the space between the wire and insulation cutting blades 89, 91; and with a pair of L-shaped ejector blades 181 which are swingable into and out of the space between the cutting blades 89 and 92. The ejector blades 179 and 181 are normally located between the respective cutting blades in a retracted position as indicated in FIG. 6 so as to present an upright ejecting finger in back of wire stock lodged between the upper and lower cutting blade assemblies 84 and 93. Rocking of the shaft 178 swings the ejector blades 179 and 181 from the retracted position in which they are shown in FIG. 6 to the projected position in which they are shown in FIG. 11 and then back to the retracted FIG. 6 position. Such rocking of the shaft 178 is effected by an actuating arm 182 (FIG. 6) at the side of the cutter blade assembly 84 next to the gripping jaws 101 and 102. A coil spring 183 between the arm 182 and a bracket plate 184 on the lower blade mounting structure normally biases the ejector blades into the retracted position in which they are shown in FIG. 6.

A bracket assembly 186 (FIG. 6) is secured to the upper blade mounting structure 94 in a depending position and in up and down slideable relation to the lower blade mounting structure 86. The bracket assembly 186 carries a latch lever 187 on a pivot pin 188, and a coil spring 189 is hooked at one end to an anchor pin 191 on the bracket structure 186 and at the other end to the latch lever 187 so as to bias the lever against a stop pin 192 on the bracket assembly 186. When the upper tool supporting rail 61 is moved downward into its lowered position as shown in FIG. 9, the nib of the latch lever 187 moves past the free end of the actuating arm 182 and engages it from below as shown in FIG. 9. Subsequent upward movement of the upper tool supporting rail 61 as shown in FIG. 11 then causes the strippings 173, 174 to be ejected by the blades 179 and 181. During the last portion of the up stroke of the upper rail 61 the nib of the latch lever 187 clears the actuating arm 182 and the latter is then pulled back into its normal position by the spring 183 as illustrated by FIG. 6.

THE CUT WIRE DISCHARGE MECHANISM

After the desired length of wire has been cut from the stock as illustrated by FIG. 10, the cut wire is released from the gripping jaws 101 and 102 by upward movement of the upper rail 61 and the released cut wire is then ejected lengthwise from the housing assembly 75 (FIG. 1) upon a collecting trough 193 by means of a pair of rollers 194 and 196. The roller 194 is supported on a rotary shaft which is mounted on the housing assembly 75 and is driven by a belt 197 from the input shaft of the clutch and brake unit 12. As shown in FIG. 2, a driving pulley 198 for the belt 197 is bolted to the outer side of the belt pulley 13 and the roller 194 will therefore be constantly rotating as long as the driving motor 8 is running. A tensioning roller 199 (FIG. 3) bears upon the belt 197 between the roller 194 and the pulley 198.

The roller 196 is rotatably supported by a bell crank lever 201 (FIG. 3) which is rockable on a pivot pin 202 mounted within the housing assembly 75. The bell crank lever 201 is operatively connected with the depending arm 161 of the rocker arm assembly 147 (FIG. 14) so that the roller 196 will be moved toward the roller 194 when the rocker arm assembly 147 is swung about the shaft 136 in the direction of arrow 163 by operation of the cam discs 148 and 152 and cam rollers 149 and 153. The operative connection between the arm 161 of the rocker arm assembly 147 and the bell crank lever 201 (FIG. 14) comprises a rod 203 which is pivoted on the bell crank lever 201 by a pin 204 and extends through a swivel pin 206 in a bracket 207 on the lever arm 161. A coil spring 208 surrounding the pin 203 bears at one end against the end of the pin which is pivoted to the bell crank lever 201 and at the other end against the swivel pin 206 within the bracket 207. A pair of nuts 209 on the threaded end of the rod 203 limits sliding movement of the rod 203 relative to the swivel pin 206 under the prsssure of the spring 208. When the rocker arm assembly 147 is swung in the direction of arrow 163 to move the gripping jaws 101 and 102 away from the cutting blade assemblies, the roller 196 moves into engagement with the cut wire length 26' and presses it against the rotating roller 194 under the action of the coil spring 208. The cut wire length 26' will then be expelled from the machine by the rotation of the roller 194.

OPERATION

In order to prepare the machine for operation, the pressure roller 7 of the computerized measuring mechanism is lifted from the roller 6 and the feeding rollers 23 and 24 are adjusted upwardly by admission of air pressure to the barrel end of the pneumatic cylinder 54. Wire stock 26 is then manually pulled from the supply reel 211 (FIG. 1) and passed through the gap between the rollers 6 and 7 and through the gaps between the feed rollers 21, 22 and 23, 24 into the telescopic tube assembly 111, 112. The cam shaft 128, when at rest, is maintained in a starting position which places the clamping jaws 78 and 82, as well as the cutting assemblies 84 and 93 and the gripping jaws 101 and 102 into the open positions in which they are shown in FIGS. 1 and 3. At the same time the shiftable tube 112 occupies the projected FIG. 3 position between the tool supporting rails 59 and 61. As the next step, the roller 7 is then lowered into engagement with the wire stock 26 and the feed rollers 23 and 24 are lowered upon the wire stock by admission of air pressure into the gland end of the cylinder 54. The motor 8 is then started by means of one of the push buttons 3 on the housing assembly 2. The input shaft of the clutch and brake unit 12 and the drive pulley 13 of the one revolution clutch 17 will then be constantly rotating but the output shaft of the unit 12 will remain at rest and the cam shaft 128 will also remain at rest. A starting impulse will then be transmitted to the clutch and brake unit 12 by means of one of the push buttons 3 and as a result the output shaft of the unit 12 will be rotated and transmit driving power to the feeding device A. Operation of the feeding device A will pull the wire stock from the supply reel 211 and the moving wire stock will rotate the measuring wheel 6 of the computerized measuring mechanism. The measuring mechanism includes provisions for preselecting a desired length of the cut wire to be discharged from the machine and when this length has been played out by the feeding device A, the measuring device emits a stop signal to the unit 12 which causes the feeding device to stop. At the moment the stop signal is emitted to the unit 12, a trip signal is emitted by the measuring mechanism to the solenoid 132 (FIG. 12) which triggers the one revolution clutch 17. As a result, the cam shaft 128 will then be rotateed through a full revolution and actuate the wire stock clamping means B (FIG. 1), the cutting means C and the cut wire gripping means D in the predetermined sequence which is illustrated by the timing diagram of FIG. 20.

Figure 20:
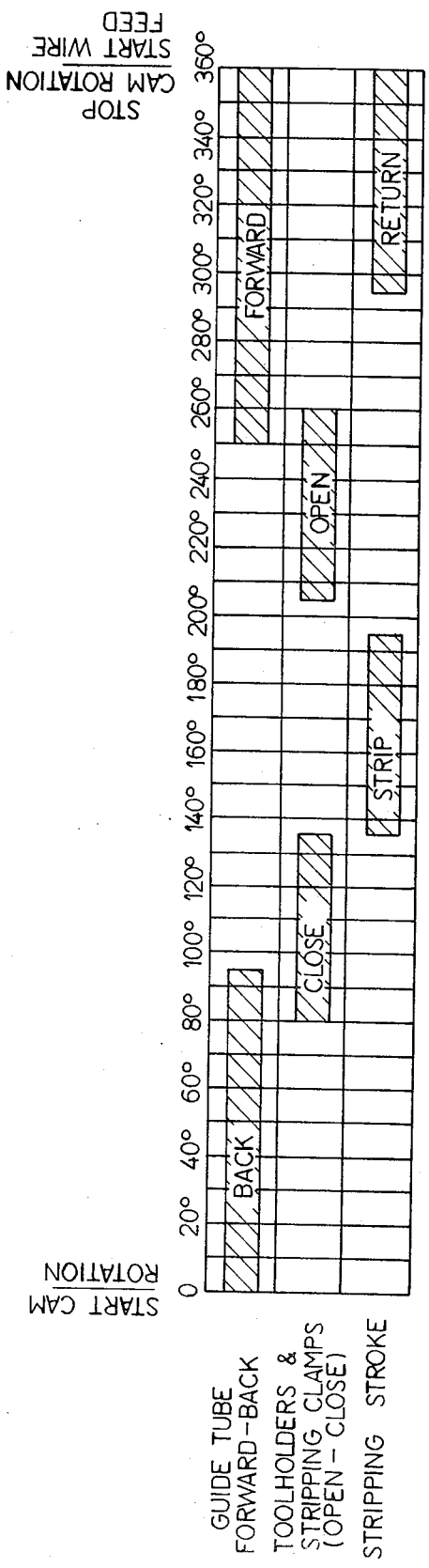
FIG. 20 is a timing diagram for the operation of the machine.

From FIG. 20, it will be seem that initial rotation of the cam shaft 128 through an angle of about 95° causes the tube 112 to be withdrawn from the space between the upper and lower tool supporting rails 59 and 61. When the cam shaft 128 has completed a rotation of 80°, the upper tool supporting rail 61 starts to move down and comes to its lower limit position when the cam shaft has completed rotation through about 135°. At that point, the rocker arm assembly 147 begins to move in the direction of arrow 163 (FIG. 14) and comes to a stop when the cam shaft has completed rotation through 195°. During this period of the operating cycle, insulation is stripped from the adjacent ends of the wire stock 26 and the cut wire 26' as illustrated by FIG. 10. When the cam shaft 128 has completed a rotation through about 205°, the upper rail 61 begins to move upward and upon completion of a turn of 260° of the cam shaft 128, the tool supporting rail 61 has returned to its fully raised position in which it is shown in FIG. 3. In that condition of the machine, the wire stock is released from the clamping jaws 78 and 82. The cutting blade assemblies 84 and 93 are disengaged from the wire stock and the cut wire 26' is released from the gripping jaws 101 and 102. When the cam shaft has completed a rotation of 250° the guide tube 112 begins to move into the space between the tool supporting rails 59 and 61 and will arrive at its fully projected position when the cam shaft 128 comes to a stop after completion of a full revolution. When the cam shaft 128 has completed a turn of about 295°, the cutting blade assemblies 84 and 93 and the gripping jaws 101 and 102 begin their return movement to the starting position in which they are shown in FIG. 3 and at which they arrive when the cam shaft 128 has completed a complete revolution.

During the final phase of the opeating cycle the cut wire length is ejected from the machine into the collecting trough 193 by operation of the rollers 194 and 916 while the gripping jaws 101 and 102 are spaced from the cutting assemblies 84, 93.

The minimum distance of the tool supporting rail 61 from the tool supporting rail 59 may be adjusted by means of the adjusting screw 68 so that the stripping blades 91, 91' and 92, 92' will cut to the proper depth into the insulation of the wire but not cut into the metal core of the wire.

The computerized measuring mechanism includes provisions for automatically starting a new operating cycle of the machine as sson as one operating cycle has been completed. The number of wires to be cut from stock and their length may thus be preselected and produced with great accuracy and at a high rate of speed.

I claim:

1. In an insulated wire cutting and stripping machine, the combination of a frame extending lengthwise between opposite ends thereof; wire stock feeding means operatively mounted on said frame adjacent one of said ends thereof; wire stock clamping means operatively mounted on said frame between said stock feeding means and said other end of said frame at a predetermined distance from said feeding means; wire stock cutting means operatively mounted on said frame between said clamping means and said other end of said frame in lengthwise back and forth shiftable relation thereto; and actuating means operable to move said clamping means and said cutting means into and out of cooperative engagement with stock played out by said feeding means and to shift said cutting means in the longitudinal direction of said played out stock alternately toward and away from said clamping means.

2. The combination set forth in claim 1 and further comprising a power source, selectively engageable and disengageable power transmitting means operatively interposed between said power source and said feeding means; and selectively engageable and disengageable power transmitting means operatively interposed between said power source and said actuating means.

3. The combination set forth in claim 1 wherein said feeding means comprise a pair of radially spaced wire stock support rollers; a pair of radially spaced clamping rollers in lateral pressure exerting relation to wire stock extending over said supporting rollers; gear wheels non-rotatably secured, respectively, to said clamping rollers; an idler gear in mesh with said gear wheels; and belt means connecting said supporting rollers and said idler gear for rotation in unison with each other.

4. The combination set forth in claim 3 and further comprising a power source, selectively engageable and disengageable power transmitting means operatively interposed between said power source and one of said wire stock supporting rollers; and selectively engageable and disengageable power transmitting means operatively interposed between said power source and said actuating means for said clamping and cutting means.

5. The combination set forth in claim 1 wherein said wire stock clamping means and said wire stock cutting means are mounted on relatively reciprocable supporting means for unitary movement into and out of cooperative engagement with wire stock played out by said feeding means.

6. The combination set forth in claim 1 wherein said actuating means comprise cam controlled link mechanisms operatively associated, respectively, with said clamping and cutting means and interrelated with each other so as to maintain said clamping and cutting means in cooperative engagement with said played out stock while said cutting means are pulled away from said clamping means.

7. In an insulated wire cutting and stripping machine, the combination of wire stock feeding means, wire stock clamping means, wire stock cutting means, cut wire gripping means and actuating means operable to move said clamping means, said cutting means and said gripping means into and out of cooperative engagement with stock played out by said feeding means, to pull said cutting means and said gripping means away from said clamping means and to pull said gripping means away from said cutting means.

8. The combination set forth in claim 7 and further comprising a power source; selectively engageable and disengageable power transmitting means operatively interposed between said power source and said feeding means; and selectively engageable and disengageable power transmitting means operatively interposed between said power source and said actuating means.

9. The combination set forth in claim 7 wherein said wire stock clamping means, said wire stock cutting means and said cut wire gripping means are mounted on relatively reciprocable supporting means for unitary movement into and out of cooperative engagement with wire stock played out by said feeding means.

10. The combination set forth in claim 9 wherein said actuating means comprise a cam controlled link mechanism for reciprocating said supporting means; a cam controlled link mechanism for shifting said cutting means toward and away from said clamping means, and a cam controlled link mechanism for shifting said gripping means toward and away from said cutting means; said cam controlled link mechanisms being operatively interrelated with each other so as to maintain said clamping and cutting means in cooperative engagement with said played out stock while said cutting means are pulled away from said clamping means, and so as to maintain said cutting and gripping means in cooperative engagement with said played out stock while said gripping means are moved away from said cutting means.

11. The combination set forth in claim 10 and further comprising a power source, selectively engageable and disengageable power transmitting means operatively interposed between said power source and said feeding means; and a one-revolution clutch having a constantly rotating input member connected in driven relation to said power source, an intermittently rotating output member connected in driving relation with said cam controlled link mechanisms, and a control element for initiating rotation of said output member.

12. In an insulated wire cutting and stripping machine, the combination of a main frame; a pair of relatively reciprocable tool supports operatively mounted on said main frame; a pair of relatively opposed wire stock clamping jaws mounted respectively on said tool supports; a pair of relatively opposed wire and insulation cutting blade assemblies mounted, respectively on said tool supports in laterally shiftable relation to said clamping jaws; and a pair of relatively opposed cut wire gripping jaws mounted, respectively, on said tool supports in laterally shiftable relation to said cutting blade assemblies.

13. The combination set forth in claim 12 and further comprising a wire guide tube operatively mounted on said main frame for longitudinal reciprocating movement into and out of the space between said tool supports.

14. The combination set forth in claim 12 and further comprising a cut wire discharge mechanism operatively mounted on said main frame at the side of said cut wire gripping jaws remote from said wire and insulation cutting blade assemblies.

15. In an insulated wire cutting and stripping machine, the combination of a main frame; a stationary and a reciprocable tool support operatively mounted on said frame in opposed relation to each other; a pair of relatively opposed wire stock clamping jaws mounted respectively on said tool supports; a pair of relatively opposed wire and insulation cutting blade assemblies mounted respectively on said tool supports in laterally shiftable relation to said clamping jaws; strippings throw-out means operatively associated with the cutting blade assembly on said stationary tool support; and a pair of relatively opposed cut wire gripping jaws mounted respectively on said tool supports in laterally shiftable relation to said cutting blade assemblies.

16. The combination set forth in claim 15, wherein said strippings throw-out means comprise a throw-out finger assembly rockably mounted on said stationary tool support and actuating means for said throw-out finger assemby operatively connected with said reciprocable tool support.

17. In an insulated wire cutting and stripping machine, the combination of a main frame, a stationary and a reciprocable tool support operatively mounted on said main frame in opposed relation to each other, adjusting means for said stationary tool support operable to vary the minimum spacing of the latter from said reciprocable tool support; a pair of relatively opposed wire stock clamping jaws mounted respectively on said tool supports; a pair of relatively opposed wire and insulation cutting blade assemblies mounted respectively on said tool supports in laterally shiftable relation to said clamping jaws; and a pair of relatively opposed cut wire gripping jaws mounted respectively on said tool supports in laterally shiftable relation to said cutting blade assemblies.

18. In an insulated wire cutting and stripping machine, the combination of a main frame; a complementary pair of wire stock clamping jaws operatively mounted on said main frame for relative movement into closed and open positions; a complementary pair of wire and insulation cutting blade assemblies operatively mounted on said main frame for relative movement into closed and open positions and for lateral shifting movement relative to said clamping jaws; a complementary pair of cut wire gripping jaws operatively mounted on said main frame for relative movement into closed and open positions and for lateral shifting movement relative to said cutting blade assemblies; and actuating means for said clamping jaws, cutting blade assemblies and gripping jaws operatively interrelated with each other so as to adjust said clamping jaws, cutting blade assemblies and gripping jaws from their open to their closed positions, then to shift said cutting blade assemblies away from said clamping jaws and to shift said gripping jaws away from said cutting blade assemblies, and subsequently to adjust said clamping jaws, cutting blade assemblies and gripping jaws to their open positions, to reshift said cutting blade assemblies toward said clamping jaws and to reshift said gripping jaws toward said cutting blade assemblies.

* * * * *